United States Patent [19]

Dedolph

[11] 4,221,749

[45] Sep. 9, 1980

[54] METHOD OF MAKING A BODY OF ROOTING MEDIA

[75] Inventor: Richard R. Dedolph, Naperville, Ill.

[73] Assignee: Gravi-Mechanics Co., Naperville, Ill.

[21] Appl. No.: 928,789

[22] Filed: Jul. 28, 1978

Related U.S. Application Data

[63] Continuation of Ser. No. 712,393, Aug. 6, 1976, abandoned, which is a continuation-in-part of Ser. No. 474,269, May 29, 1974, Pat. No. 3,973,353.

[51] Int. Cl.$^2$ ............................................. B29D 27/04
[52] U.S. Cl. ...................................... 264/45.3; 47/74; 47/DIG. 7; 264/338
[58] Field of Search .................. 47/74, 37, DIG. 7; 61/36 R; 264/338, 45.3

[56] References Cited

U.S. PATENT DOCUMENTS

| | | | |
|---|---|---|---|
| 3,101,244 | 8/1963 | Hood et al. | 264/338 X |
| 3,373,009 | 3/1968 | Pruit et al. | 47/37 X |
| 3,413,390 | 11/1968 | Heiss | 264/338 X |
| 3,492,394 | 1/1970 | Heine | 264/338 X |
| 3,805,531 | 4/1974 | Kistner | 61/36 R |
| 3,805,532 | 4/1974 | Kistner | 61/36 R |
| 3,812,619 | 5/1974 | Wood et al. | 47/DIG. 7 |
| 3,834,072 | 9/1974 | Rack | 47/74 |
| 4,038,088 | 7/1977 | White et al. | 264/338 X |

*Primary Examiner*—Philip Anderson
*Attorney, Agent, or Firm*—Vogel, Dithmar, Stotland, Stratman & Levy

[57] ABSTRACT

A rooting media in the form of a resilient, integral body of spongy open-celled hydrophilic polymer forming a first essentially continuous phase extending throughout the body and having passages therethrough forming a second essentially continuous phase extending throughout the body, a quantity of particles of soil mixture distributed throughout the body of spongy polymer and held thereby with a substantial portion of the surface area of the particles of soil mixture exposed and in communication with the passages, the exposed particles of soil mixture providing colloidal contact exchange surfaces in communication with the passages and having collectively a porosity maintenance capacity and a water holding capacity and an ion exchange capacity and a pH buffering capacity; also disclosed is a method of making such a body of rooting media, as well as a release agent useful in that method; there further is disclosed a particular form of rooting media for use in propagation by air layering and a method of propagation by air layering.

10 Claims, 18 Drawing Figures

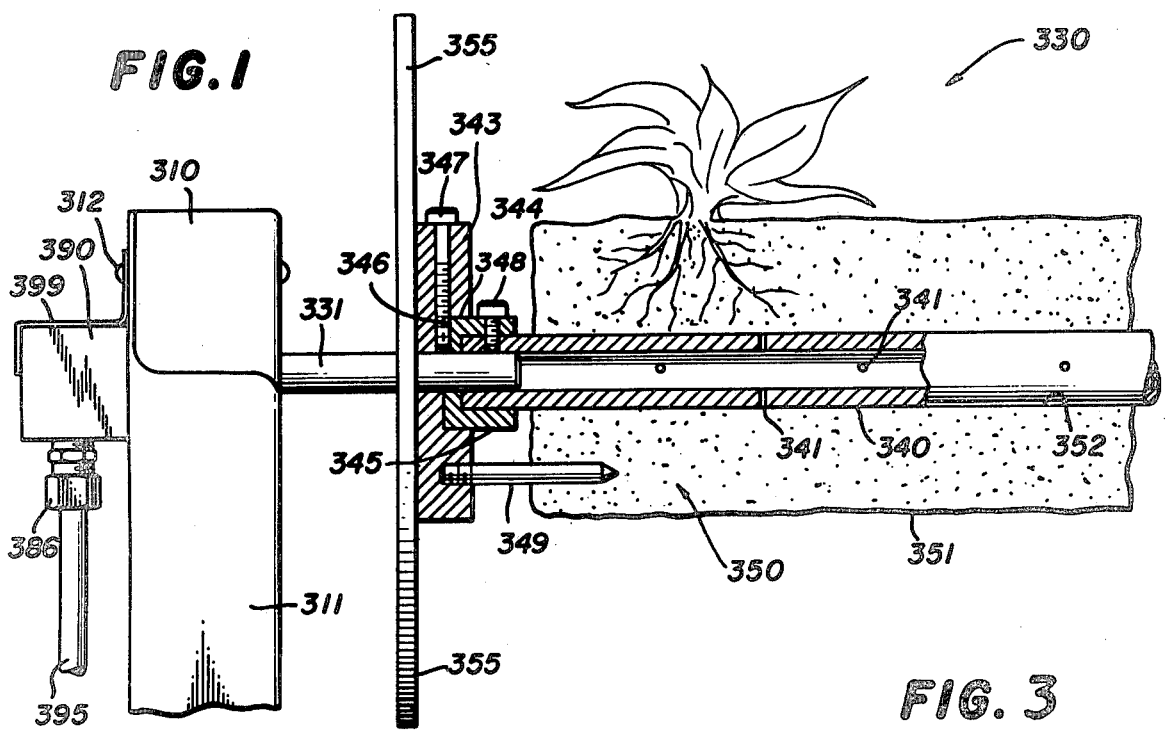
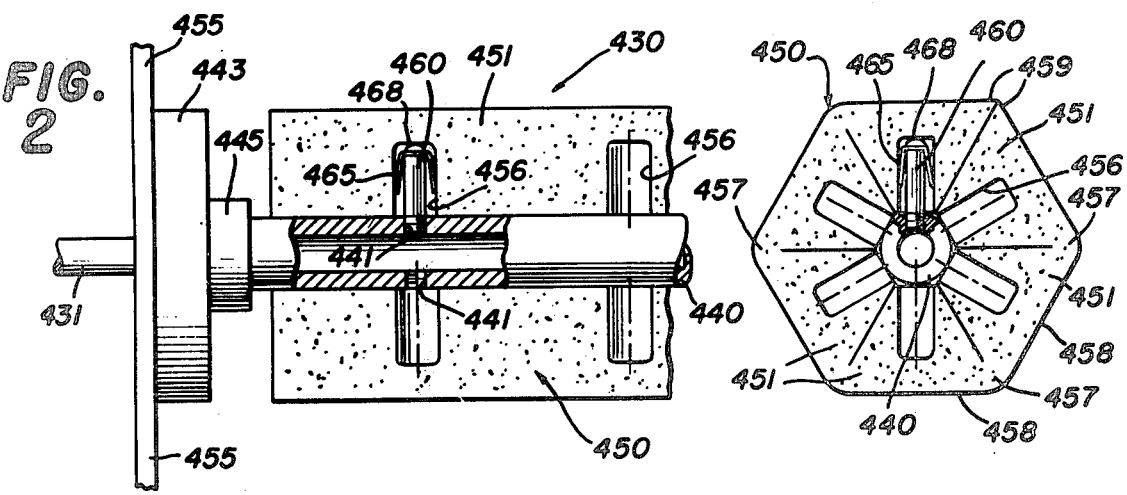
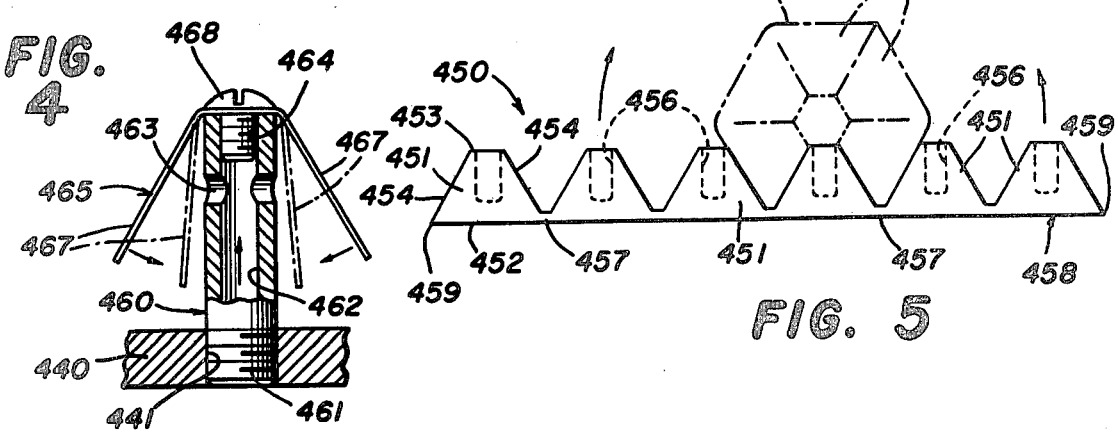

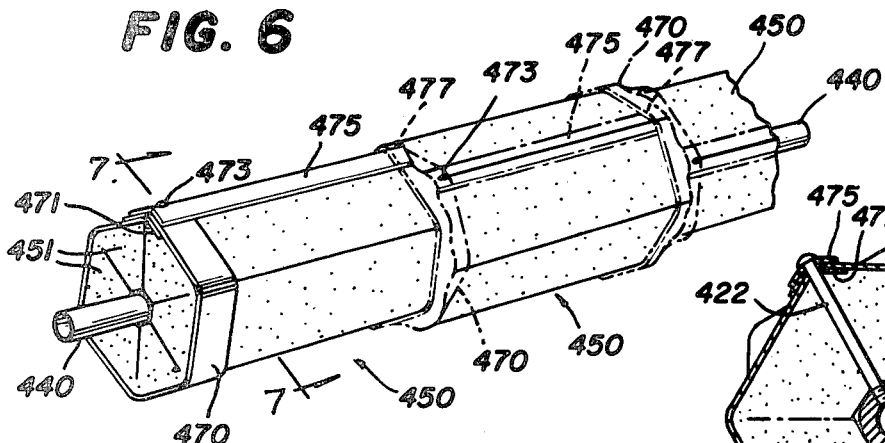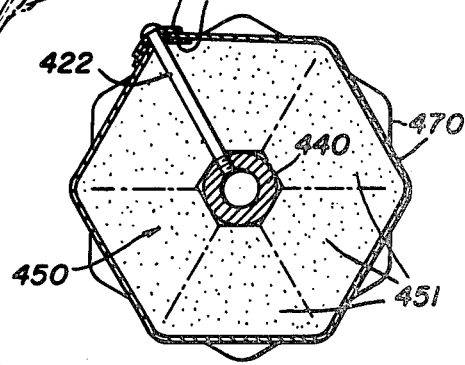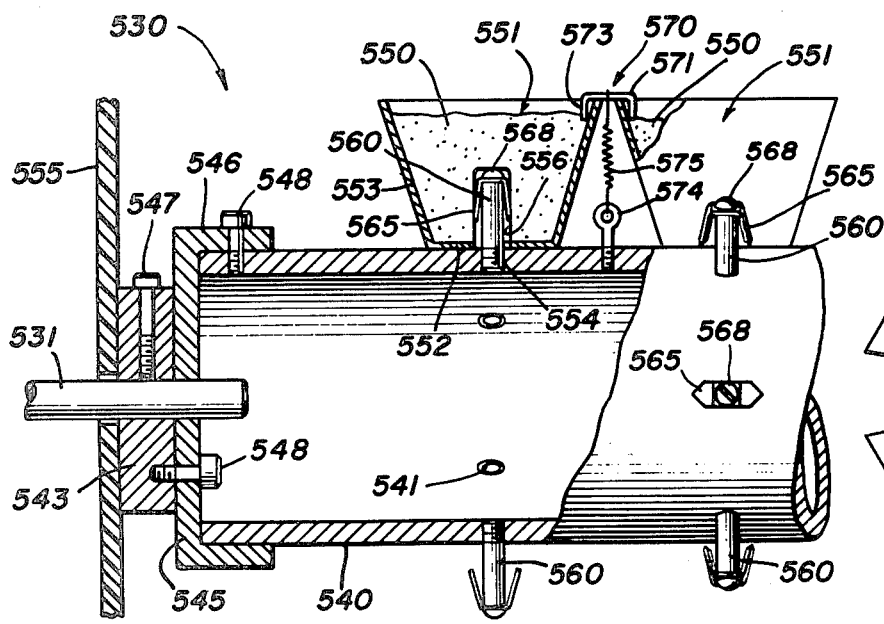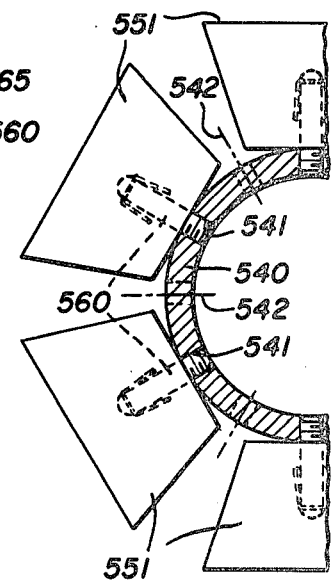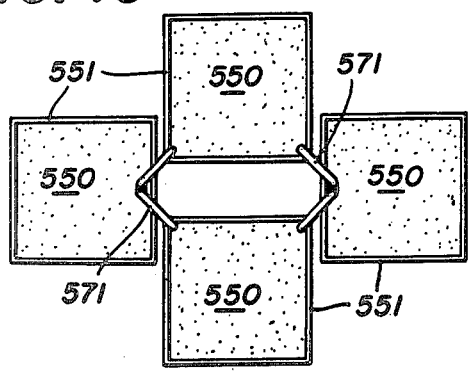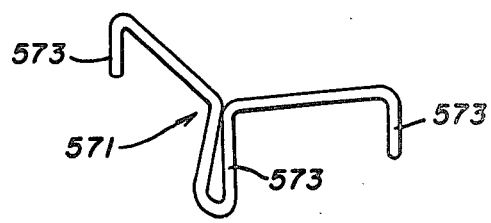

METHOD OF MAKING A BODY OF ROOTING MEDIA

CROSS-REFERENCE TO RELATED APPLICATION

This is a continuation of application Ser. No. 712,393, filed Aug. 6, 1976 now abandoned, which is a continuation-in-part of applicant's co-pending application for U.S. Letters Patent Ser. No. 474,269 filed May 29, 1974 for PLANT GROWTH ACCELERATING APPARATUS, now U.S. Pat. No. 3,973,353 granted Aug. 10, 1976 and the disclosure of that prior application is incorporated herein by reference.

BACKGROUND OF THE INVENTION

The present invention relates generally to improvements in rooting media, improvements in methods for making such rooting media including improved release agents therefor.

Rooting media comprising soil mixture and synthetic organic resin polymers have been disclosed in prior patents, for example, U.S. Pat. No. 3,379,009 granted Mar. 12, 1968 to Malcom E. Pruitt and Joseph M. Baggett, U.S. Pat. Nos. 3,805,531 and 3,805,532 granted Apr. 23, 1970 to John F. Kistner, and U.S. Pat. No. 3,812,619 granted May 28, 1974 to Louis L. Wood and Kurt C. Frishch.

Referring first to the Kistner U.S. Pat. Nos. 3,805,531 and 3,805,532, these patents disclose a rooting media that is formed by first mixing a prepolymer with aggregate or soil mixture and then adding water into that mixture. This method serves to infuse the prepolymer into the interstices of the aggregate or soil mixture, thereby tending to block those interstices and also to coat the exposed surface of the individual particles. This limits water infiltration and aeration of the rooting media and surface phenomena such as ion exchange. Since the prepolymer reacts quickly with water, a skin tends to form around the particles of soil mixture this giving a granular material with large pore spaces and corresponding large passageways therethrough. As a result, low capillary water content is achieved in the rooting media, so that it is necessary to water more often and there is a substantially lower field capacity, i.e., ability of the rooting media to hold water after a twenty-four hour period of draining and evaporation; likewise the rooting media is subject to quickly drying in air. The surfaces of the particles of soil mixture are essentially covered, i.e., the prepolymer flows into the soil interstices and covers the surfaces which ordinarily provide colloidal contact exchange with roots growing thereagainst; likewise the resulting rooting media has poor water holding capacity, low ion exchange capacity and low pH buffering capacity.

Referring to the Wood et al. U.S. Pat. No. 3,812,619, this patent shows the method of forming a rooting media wherein the aggregate or soil mixture are mixed with water to form a first mixture. The first mixture is thereafter poured into a body of the prepolymer. Using this method, it is necessary to have a higher prepolymer concentration in order to obtain a cohesive mass. As a result, the rooting media produced thereby is rubbery in nature, so that seeds planted beneath the surface thereof have severe difficulty in sprouting therethrough, roots have difficulty in growing therein, and it is difficult to obtain adequate watering thereof. The method used by these patentees also provides for greater foaming so that the resultant rooting media is less dense with large cells and correspondingly large passageways therethrough. As a result lower capillary water content is obtained so that it is necessary to water more often, and a lower field capacity is achieved, i.e., the ability of the rooting media to hold water after a twenty-four hour period of draining and evaporation; likewise, the rooting media is highly susceptible to rapid air drying. In addition there is a formation of a rather impenetrable skin at the exposed areas, thus discouraging sprouting of seeds therethrough and the passage of water thereinto. There also is a relatively lower soil-like material content in the resultant rooting media, giving a lower ion exchange capacity, a lower water holding capacity and a lower pH buffering capacity. As a result, it is necessary to fertilize more frequently and there is a greater loss of fertilizers through leaching.

SUMMARY OF THE INVENTION

The present invention provides improved methods for forming rooting media with improved release agents for use in such methods.

This is accomplished in the present invention, and it is an object of the present invention to accomplish these desired objectives, by providing a rooting media for use in plant propagation comprising a resilient, integral body of spongy open-celled hydrophilic polymer forming a first essentially continuous phase extending throughout the body and having passages therethrough forming a second essentially continuous phase extending throughout the body, a quantity of particles of soil mixture distributed throughout the body of spongy polymer and held thereby with a substantial portion of the surface area of the particles of soil mixture exposed and in communication with the passages, the exposed surface areas of the particles of soil mixture material providing colloidal contact exchange surfaces in communication with the passages and having collectively a porosity maintenance capacity and a water holding capacity and an ion exchange capacity and a pH buffering capacity, the passages facilitating the growth of roots through the body and against the exposed surfaces of the particles of soil mixture and the contact exchange surfaces provided thereby so as to effect direct ion uptake therewith, the passages also providing ready entry for water and air throughout the body and against the exposed surfaces of the particles of soil mixture and the roots growing in the passages.

In connection with the foregoing object, it is another object of the invention to provide improved methods of making bodies of rooting media of the type set forth.

Yet another object of the invention is to provide an improved release agent comprising a dispersion of lecithin in an acetone-water solution which upon application to molding surfaces can be dried to provide layers of lecithin thereon useful in accommodating the molding of a plurality of parts thereagainst without retreatment with the release agent.

Further features of the invention pertain to the particular arrangement of the parts of the rooting media and the steps of the method of making the same, whereby the above outlined and additional operating features thereof are attained.

The invention, both as to its organization and method of operation, together with further features and advantages thereof, will best be understood with reference to the following specification taken in connection with the accompanying drawings.

BRIEF DESCRIPTION OF THE DRAWINGS

FIG. 1 is a fragmentary view partly in section of one end of a plant bed carrying a rooting media made in accordance with the present invention;

FIG. 2 is a view partly in section of a modification of a plant bed carrying a modification of a rooting media made in accordance with the present invention;

FIG. 3 is a view in cross section through the plant bed and rooting media of FIG. 2;

FIG. 4 is an enlarged view partly in section of one end of one of the watering tubes of FIG. 2;

FIG. 5 is an end view of a section of a rooting media useful in the plant bed of FIGS. 2-4, the rooting media being shown in the as-molded condition in solid lines and being shown in the folded condition in dashed lines;

FIG. 6 is a partial perspective view illustrating the manner of mounting a plurality of the rooting media sections of FIG. 5 on a single hollow pipe;

FIG. 7 is a view in cross section along the line 7—7 of FIG. 6;

FIG. 8 is an enlarged view of one end of a second modification of a plant bed and carrying pots containing rooting media made in accordance with the present invention;

FIG. 9 is a partial sectional view illustrating the angle of staggering of alternate rows of pots in the plant bed of FIG. 8;

FIG. 10 is a diagrammatic view illustrating the staggered relationship of pots in adjacent rows on the plant bed of FIG. 8;

FIG. 11 is an enlarged perspective view of the hooks forming a part of the structure for mounting the pots on the plant bed of FIG. 8;

DESCRIPTION OF THE PREFERRED EMBODIMENTS

Figure 12:
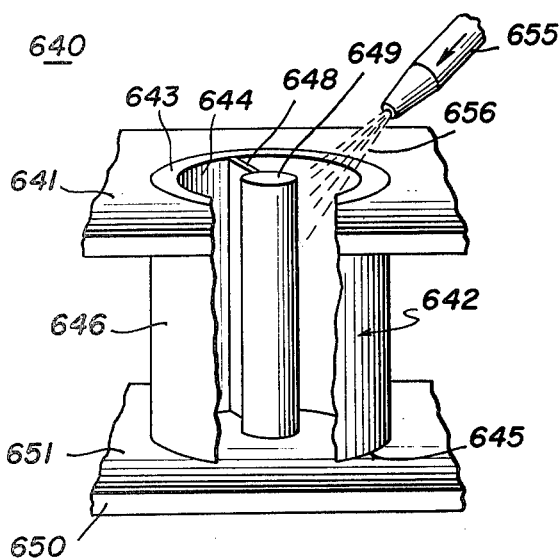
FIG. 12 is a fragmentary view in perspective with certain portions broken away of a mold for forming a section of rooting media useful in the propagation of plants by air layering, and diagrammatically illustrating the application of release agent thereto.

In FIG. 1 there is illustrated a first preferred embodiment of a plant bed 330 carrying a cylinder 350 of rooting media made in accordance with the present invention. In FIG. 1 stub shafts 331 are provided carrying thereon a pipe 340 having openings 341 thereon. A retainer block 343 (formed of plastic) is provided with an opening therein through which extends the associated stub shaft 331 and a recess 344 that receives a cap 345 (also formed of plastic), the cap 345 receiving the adjacent end of the pipe 340 therein. A first set screw 347 extends radilly through the block 343 and into a recess 346 in the end of the cap 345 and engages against the adjacent stub shaft 331 to secure the parts thereto. A second set screw 348 passes through the flange of the cap 345 and through an opening in the pipe 340 and also engages against the stub shaft 331. Disposed about the pipe 340 is the body of rooting media 350 that is cylindrical in shape as illustrated and has a cylindrical outer surface 351. An opening 352 extends longitudinally through the rooting media 350 and receives the pipe 340. A plurality of spikes 349 extending longitudinally from the retainer block 343 engaging into the adjacent end of the rooting media 350 to cause the rooting media 350 to rotate with the pipe 341 and associated parts. There also is provided the usual plant shield 355 secured as by cement to the retainer block 343.

The rooting media 350 is unitary in structure and self-supporting and cohesive and in accordance with the present invention is formed of a body of soil mixture bound by an open-celled hydrophilic polymer of synthetic organic plastic resin. The soil mixture may be in fact a true soil, for example, mucks, peats, clays, sands, silts or silt loams. Alternatively, the soil mixture may be a modified mineral such as pearlite, ground pumice or expanded mica. Also useful as the soil mixture are coarsely ground composted organic material such as straw, sawdust, pecan hulls, rice hulls, peanut hulls, leaf mulch and the like. Other useful soil mixtures are decomposed organic material such as human or animal manures, leaves or garbage.

The polymer must be open-celled and hydrophilic to be useful to form the rooting media 350. One preferred such material is a polyurethane polymer sold by the 3M Company under the trade designation XB-2382. Also useful are cellulose resins and polyvinyl chloride resins. Further details of the construction, composition and method of molding the rooting media 350 will be discussed hereinafter.

After the rooting media has been formed, it may be heated to 180° F., such as by steam, for approximately 2 to 10 minutes. Such heating tends to loosen the structure and to improve the ability of the material to receive roots therethrough. Heating also serves to pasteurize the rooting media so as to prevent infection of plants grown thereon. The heating further improves the water holding characteristics of the rooting media, the rooting media draining better, for example, after heating. Finally, heating improves the handling characteristics of the rooting media, for example, making cutting and shaping thereof easier and cleaner.

In a constructional example of the plant bed 330, the pipe 340 has an external diameter of 1 inch and is preferably formed of stainless steel, while the block 343 and the cap 345 are formed of polyvinyl chloride resin. The rooting media 350 has an outer diameter of approximately 4 inches and the opening 352 extending therethrough has a diameter of approximately 1 inch to receive the pipe 340 therein. The openings 341 in the pipe 340 are spaced longitudinally 3 inches so as to provide watering of the rooting media 350 from the inner surface thereof outwardly. The rooting media 350 may be of a single piece and have a longitudinal extent of 12 feet; alternatively, the rooting media 350 may be made up of several longitudinal sections, the adjacent ends of the sections of the rooting media 350 being suitably joined to insure rotation thereof with the pipe 340.

Referring to FIGS. 2 through 7, there is illustrated a first modification of a plant bed 430 useful in the present invention in place of the plant bed 330 described heretofore. The stub shafts 431 carry thereon a pipe 440 having threaded openings 441 therein along the length thereof. A retainer block 443 is provided with an opening therein through which extends the associated stub shaft 431 and a recess that receives a cap 445, the cap 445 receiving the adjacent end of the pipe 440 therein. Set screws (not shown) interconnect the stub shaft 431, the block 443, the cap 445 and the pipe 440. Disposed in the threaded openings 441 of the pipe 440 are watering tubes 460, each of the tubes 460 being formed of a suitable synthetic organic plastic resin, such as nylon, and having a threaded outer end 461 threadedly received in one of the openings 441 so as to mount the tube 460 in a position extending radially outwardly from the pipe 440. A longitudinal opening 462 is provided in the tube 460 as is a pair of transverse openings 463, whereby water can be fed from the opening in the stub shaft 431 into the pipe 440 and then through the openings 462 and 463 in the tube 460. In order to insure that the openings 463 remain clear for passage of water therethrough upon the insertion of the tube 460 into a body of rooting media, a protective shield 465 is provided thereon. The shield 465 is formed of plastic and has two pointed ends 467 which can be readily flexed between the solid line positions and the dashed line positions in FIG. 4, the shield 465 being held in position on the tube 460 by a screw 468 threadedly engaging the outer end of the tube 460 as at 464.

Disposed about the pipe 440 and impaled upon the tubes 460 is a rooting media generally designated by the numeral 450. Referring to FIGS. 3 and 5, it will be seen that the rooting media 450 is formed as a single cohesive body including a plurality of blocks 451 connected by hinge portions 457. Each of the blocks 451 extends the entire axial length of the rooting media 450 when applied to the pipe 440 and is generally trapezoidal in shape as viewed from the ends in FIG. 17. More specifically, each of the blocks 451 includes a longer base 452 and a shorter top 453 interconnected by sloping sides 454. Six of the blocks 451 have been illustrated interconnected by five of the hinge portions 457, whereby the rooting media 450 can be folded to provide a piece having a hexagonal outer periphery 458 with a hexagonal opening extending therethrough. Disposed in each of the blocks 451 are two laterally spaced-apart holes 456 which receive respectively one of the watering tubes 460.

Although the watering tubes 460 may provide sufficient frictional retention force to hold the rooting media 450 in place upon the pipe 440, this frictional force may not be adequate, particularly when the plant growth upon the rooting media 450 is heavy. Accordingly, auxiliary fastening structure is provided as illustrated in FIGS. 6 and 7 of the drawings. As illustrated, a plurality of first straps 470 are provided extending circumferentially around the ends of the sections of rooting media 450, the adjacent ends of adjacent sections of rooting media 450 being covered by a single strap 470. The ends 471 of the straps 470 are overlapped and receive therethrough a bolt 472 that extends radially between the end edges 459 of the rooting media 450 and engages in the threaded opening in the pipe 440. In order to cover the meeting edges 459 of each section of rooting media 450, a second strap 475 is provided with one end receiving the bolt 473 therethrough and the other free end 477 extending beneath the next adjacent strap 470. The straps 475 serve to retard evaporation of water from the free ends and outer edges 459, thus to conserve water in the system.

As is best illustrated in FIG. 7, alternate sections of the rooting media 450 are angularly displaced about the tube 440. More specifically, adjacent sections of the rooting media 450 are angularly displaced one half of the angular extent of one of the rhomboidal blocks 451, that being 30° as illustrated in the drawings.

In a constructional example of the plant bed 430, the pipe 440 has an external diameter of 1 inch and is formed of stainless steel, the diameter of the openings 471 and of the tubes 460 is 5/16 inch, and the length that the tubes 460 extends beyond the surface of the pipe 440 is approximately 1 inch. The plant shields 465 are formed of polyethylene resin and have a thickness of 1/16 inch and a width of 5/16 inch and a length from tip to tip of 1¾ inch. The rooting media 450 has an extent along the pipe 440 of 5½ inches, a total circumferential extent of the outer surface 458 of 14 inches, a height of each of the blocks 451 between the base 452 and the top 453 of 1½ inches, and a length of the top 453 of ½ inch, two of the holes 456 being provided in each of the blocks 451. The material of construction of the rooting media 450 is the same as that of the rooting media 350 described above.

In FIGS. 8 to 11 of the drawings there is illustrated a second modification of a plant bed 530 useful in the present invention in place of the plant beds 330 and 430 described hereinabove. The stub shafts 531 carry thereon a pipe 540 having series of openings 541 and 542 therein, the openings 541 being equiangularly arranged around the circumference of the pipe 540 and the openings 542 also being equiangularly arranged about the circumference of the pipe 540 and equal in number to the openings 541 and being angularly displaced with respect thereto half of the angular distance between adjacent openings 541. A retainer block 543 is provided with an opening therein through which extends the associated stub shaft 531, a set screw 547 fixing the block 543 to the stub shaft 531. Secured to the block 543 by cementing is a cap 545, the cap 545 having an outer flange 546 that fits over and receives therein the adjacent end of the pipe 540, a plurality of set screws 547 interconnecting the cap 545 both to the block 543 and the pipe 540.

Disposed in each of the openings 541 and 542 is a watering tube 560 carrying a shield 565, the construction and function of the watering tube 560 and the shield 565 being identical to that of the watering tubes 460 and the shields 465 described above.

As illustrated in FIG. 8, a plurality of blocks of rooting media 550 are provided each in its individual pot 551, the rooting media 550 preferably being of the same construction as the rooting media 350 described above, but having been cast in the pot 551 without the use of a release agent so as to be retained therein, the resin in the rooting media 550 adhesively engaging the inner surfaces of the associated pot 551. Each pot 551 is preferably formed of plastic and has a bottom 552 square in shape and upwardly extending side walls 553, four in number and forming a square opening at the top of the pot 551. Formed centrally in the pot bottom 552 is an opening 554 that communicates with a hole 556 molded in the rooting media 550. One of the watering tubes 560 extends through the opening 554 and into the hole 556 so as to provide water for the rooting media 550 and also to provide for the mounting of the rooting media 550 and associated pot 551 upon the tube 540 for rotation therewith. As is illustrated in FIGS. 9 and 10, adjacent circumferential rows of pots 551 are angularly displaced with respect to each other an angular extent equal to ½ of the angular space occupied by a pot, i.e., ½ of the angular space from center to center of adjacent pots in an annular row, this being 30° as illustrated.

To insure that the pots 551 remain upon the tube 540, and particularly when heavy plants are growing in the rooting media 550, a retainer 570 is provided mechanically and directly to interconnect the pots 551 and the pipe 540. As illustrated the retainer 570 includes a clip 571 having three depending hooks 573 thereon, the central hook 573 being displaced laterally with respect to the end hooks 573, whereby the clip 571 can engage three pots 551 in adjacent annular rows as illustrated in FIG. 10. An eye-bolt 574 is threadedly connected to the pipe 540 and is connected by a spring 575 to the clip 571, the spring 575 continually urging the clip 571 and the connected pots 551 inwardly toward the center of the pipe 540 thus to press the bottoms 552 of the pots 551 against the outer surface of the pipe 540.

In a constructional example of the plant bed 530, the pipe 540 is formed of polyvinyl chloride resin and has an outer diameter of 4 inches and a length of 12 feet. The longitudinal distance between adjacent rows of openings 541 and 542 is 3 inches and each pot 551 has a width of 2½ inches at the bottom thereof and 3 inches at the top thereof.

Figure 16:
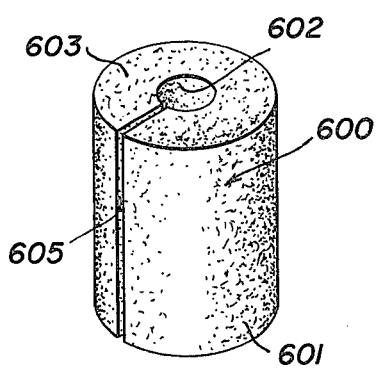
FIG. 16 is a perspective view of the section of rooting media produced using the method illustrated diagrammatically in FIGS. 12 to 15.

There is illustrated in FIGS. 12 to 18 of the drawings a rooting media generally designated by the numeral 600 that is particularly useful in the propagation of plants by air layering, together with a method of making the rooting media 600 and the method of utilizing the rooting media 600. The structure of the rooting media 600 is best illustrated in FIG. 16, where it will be seen that it comprises generally a cylindrical section having an outer surface 601 that is circular in cross section and has a length of for example 6 inches. Extending longitudinally through the rooting media 600 centrally thereof is an opening 602 that communicates with the ends 603. A slot 605 extends longitudinally of the rooting media 600 and interconnects the opening 602 and the outer surface 601.

Referring to FIGS. 12 to 15 of the drawings a molding apparatus 640 for forming the section of rooting media 600 will be described in detail. The molding apparatus 640 includes a carrier 641 in the form of an elongated essentially rigid strip having an opening therein into which is inserted one end of a cylindrical mold 642. The upper end or top surface 643 of the mold 642 is positioned flush with the upper surface of the carrier 641 and is secured thereto as at 647 by any suitable means such as an adhesive. The opening in the carrier 641 is circular and the mold 642 is cylindrical in shape and of a size to fit within the opening in the carrier 641. The mold 642 has an inner molding surface 644, a bottom surface 645 and an outer surface 646. Cooperating with the bottom surface 645 of the mold 642 is a bottom plate 650 having a top surface 651 which is smooth and cooperates with the bottom surface 645 of the mold 642 temporarily and releasably to close the lower end of the mold 642 during the molding operation. Extending radially inwardly from the surface 644 is a web 648 that forms the slot 605 in the rooting media 600 and integral with the inner end of the web 648 is a cylindrical rod 649 which serves to form the opening 602.

In carrying out the molding method of the present invention, a release agent is first sprayed upon the surfaces of the molding apparatus 640 which may come into contact with the polymer used to bind the soil-like materials into the rooting media 600. This operation is diagrammatically illustrated in FIG. 12 of the drawings, wherein a spray nozzle 655 is shown directing a stream 656 of release agent onto the inner surfaces 644 of the mold 642 and also upon the surfaces of the web 648 and the post 649, as well as the surfaces 641, 643, 645 and 651, as required. Any suitable release agent may be utilized, provided that it has no phytotoxicity, but much preferred results are obtained by using a release agent comprising lecithin, the method of making the release agent being described more fully hereinafter.

Figure 13:
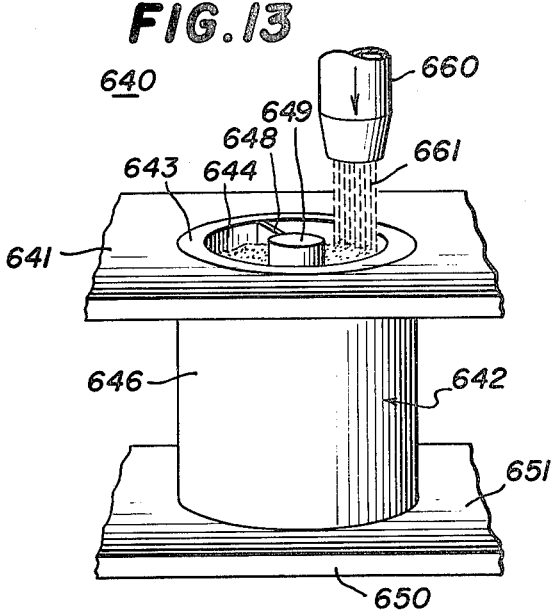
FIG. 13 is a view similar to FIG. 12 and diagrammatically illustrating the addition of a slurry containing soil-like material and polymer to the mold.
Figure 14:
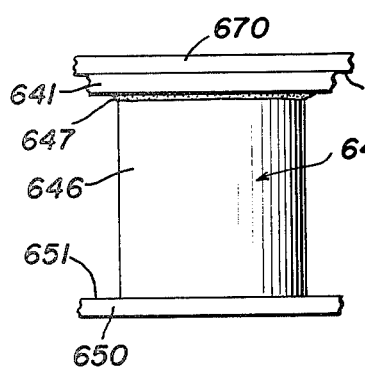
FIGS. 14 and 15 diagrammatically illustrate the closure of the open upper end of the mold of FIGS. 12 and 13 and the inversion thereof from the upright position of FIG. 14 to the upside down configuration of FIG. 15.
Figure 15:
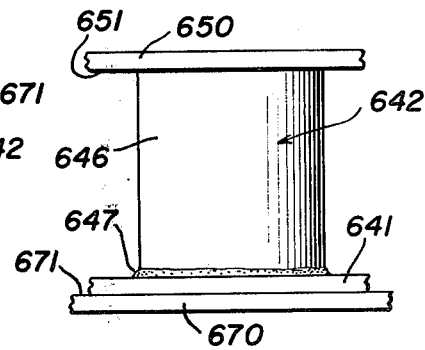

Referring to FIG. 13 of the drawings, there is diagrammatically illustrated the addition of a quantity of slurry through a nozzle 660 in the form of a stream 661, the slurry of stream 661 being applied essentially to fill each mold 642 up to a point spaced a short distance below the top surface 643 thereof. It requires a small period of time for the prepolymer in the slurry to begin reacting, and as soon as the reaction is apparent, a cover plate 670 having a lower surface 671 is placed upon the carrier 641 to close the upper end of the mold 642. The parts are then inverted to the position illustrated diagrammatically in FIG. 15, whereby to maintain the soil-like materials in the slurry 661 suspended therein while the prepolymer cures. It will be understood that the surface 671 is also coated with release agent. After the prepolymer has cured to form the rooting media 600, the rooting media 600 is removed from the mold 642 by removing the plates 650 and 670, after which the rooting media 670 can be readily pushed from the mold 642 due to the presence of the release agent thereon.

Figure 17:
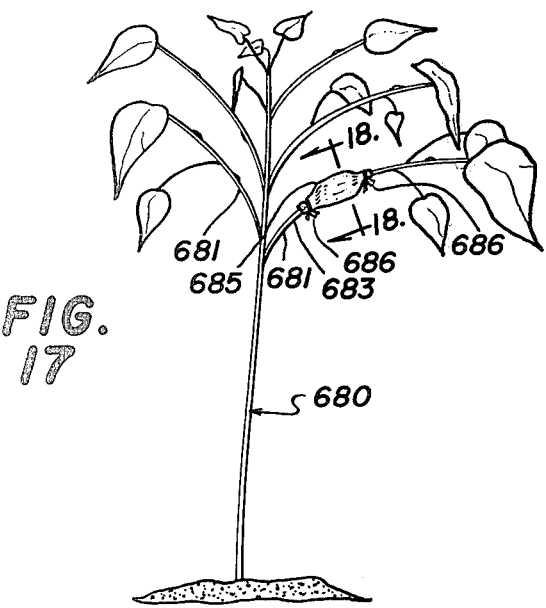
FIG. 17 is a diagrammatic view illustrating the application of the rooting media of FIG. 16 to the stem of a plant to accomplish propagation by air layering.
Figure 18:
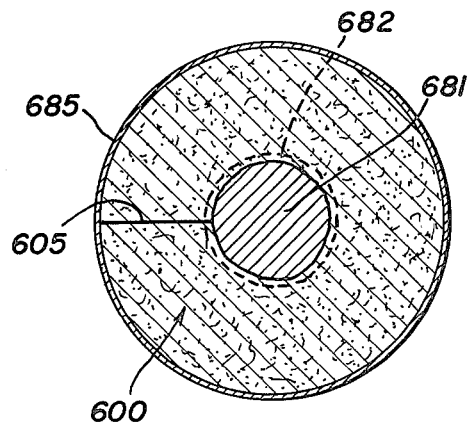
FIG. 18 is an enlarged view in section along the line 18—18 of FIG. 17.

The method of using the rooting media 600 of FIG. 16 to propagate by air layering is diagrammatically illustrated in FIGS. 17 and 18 of the drawings. A suitable plant 680 is provided having a plurality of stems 681 suitable for the air layering process. One of the stems 681 has about a ⅛ inch long section of the phloem removed therefrom such as by cutting, and the exposed surface then scarified. Using the slit 605, the rooting media 600 is slipped over the scarified area. The rooting media 600 may be thoroughly wetted either before application to the stem 681 or after application thereto. A moisture barrier film 685 is then wrapped around the rooting media 600 and the ends thereof secured as by ties 686. A callous forms at the scarified area and adventitious roots grow therefrom.

After the roots have had an opportunity to grow from the scarified stem and into the rooting media 600, which ordinarily requires from 2 to 3 weeks, the stem 681 is cut as at 683, the ties 686 removed together with the moisture barrier film 685. There results a plant ready for transplanting, preferably with the rooting media 600 intact and having roots therein.

The rooting media 600 can also be used to propagate by air layering those plants having nodes with incipient adventitious roots thereat. In those cases, the rooting media 600 is applied about such a node as described above but without removal of the phloem or scarification.

The method of FIGS. 17 and 18 can be applied to any woody plant that is difficult to propagate or root. Examplars of such plants are *Ardisia crispa* (coral berry),

*Brassaia actinophylla* (schefflera, umbrella tree), *Cocoloba rugosa* (corrugated tin tree), *Coccoloba uvifera* (sea grape), Codiaeum (croton), *Coffea arabica* (coffee tree), *Cordyline australis* (cabbage tree), *Cordyline terminalis* (ti plant), Dieffenbachia (dumb cane), *Dracaena arborea* (tree dracaena), *Dracaena deremenis* "Warneckei", Dracaena *deremensis* "Janet Craig", *Dracaena fragrans massangeana* (corn plant), *Dracaena marginata* (dragon tree), *Ficus lyrata* (fiddleleaf fig), *Ficus benjamina* (weeping fig), *Ficus elastic* (rubber plant), *Ficus macrophylla* (Banyan tree), *Monstera deliciosa* (Mexican breadfruit, cutleaf philodendron), Philodendron (x "Florida"), *Philodendron hastatum* (elephant ears), guava and rose plants.

The following are specific examples of slurries of soil-like material and prepolymers useful in carrying out the methods of the present invention to produce the rooting media thereof.

EXAMPLE 1

A soil mixture is provided including a natural organic soil, an agricultural modified mineral, fertilizers, and pH control agents, as follows:

| | | |
|---|---|---|
| Peat Soil | 78. | lbs. |
| Vermiculite | 19. | lbs. |
| Bone Meal | 0.5 | lb. |
| Dolomitic Lime | 0.75 | lb. |
| Fertilizer (5-10-5) | 0.75 | lb. |
| "Mag Amp" Fertilizer | 1. | lb. |
| | 100. | lbs. |

The above described soil mixture was then incorporated into a slurry having the following composition:

| | |
|---|---|
| Soil Mixture (47% Moisture) | 51.0 lbs. |
| Polyurethane Resin-Forming Solution | 9.0 lbs. |
| Water | 40.0 lbs. |
| | 100.0 lbs. |

The soil mixture and water were first thoroughly mixed after which the resin-forming solution was added to provide a slurry, the temperature of the slurry being kept at about 5° C. by supplying a portion of the water as ice. The resultant slurry after a short time began to foam and expand slightly. The time required from preparation of the slurry to solidification thereof to form the soil plug was about 10 minutes at an ambient temperature of 25° C.

In the soil mixture of Example 1, the peat soil comprises a relatively undecomposed organic soil which includes more than about 50% by weight of combustible materials. The peat provides physical structure including maintenance of porosity and water holding capacity in the finished rooting media. The peat soil also provides an ion exchange capacity and serves as a source of nitrogen as well as pH buffering capacity. The Vermiculite also provides physical structure including porosity and water holding capacity as well as some ion exchange capacity. The Vermiculite is particularly useful in rendering the surfaces of the rooting media water permeable, whereby water applied to the surface of the rooting media penetrates throughout the mass thereof. The bone meal provides a slowly available phosphorus source while the dolomitic lime provides pH control and a slowly available source of calcium and magnesium. The fertilizer provides an immediate source of nitrogen, phosphorus and potassium, while the "Mag Amp" provides a slowly available source of fertilizer elements. The proportions between the peat and the Vermiculite can be changed while maintaining a useful composition for the soil mixture, all as is understood by those skilled in the art. Likewise the amount of the other ingredients can be varied while providing a suitable soil mixture.

In lieu of the peat soil in Example 1, a muck soil may be utilized, muck soil being an organic soil sufficiently decomposed so that there are less than 50% by weight of combustible materials therein. Synthetic organic soil substitutes also may be provided, and preferably the soil substitutes are composted in the usual manner. In place of the Vermiculite, Perlite may be utilized, the agricultural grade having a small particle size being preferred.

In general, any combination of soils, natural and synthetic, together with modified minerals, if desired, is useful provided that the resultant soil mixture exhibits porosity maintenance capacity, water holding capacity, ion exchange capacity and pH buffering capacity. The soil mixture should also be initially resilient and be thoroughly mixed and essentially homogeneous throughout. It will be appreciated that fertilizer elements need not be incorporated into the soil mixture, but may be added thereto in aqueous solution after formulation of the rooting media as required during the growth of a plant therein. The term "soil-mixture" is used herein to refer to and mean either a single soil or a combination of soils or a mixture and combination of soil or soils with other soil-forming materials such as vermiculite and perlite, as well as various fertilizer ingredients.

The resin solution of Example 1 is a polyurethane resin prepolymer solution sold by the 3M Company under the designation "XB-2382", and is a reaction product of toluene diisocyanate and a polyester having unreacted hydroxyl groups thereon such as polyoxyethylene diols, 66 parts by weight of the prepolymer being dissolved in 34 parts by weight of acetone; therefore in the 9.0 parts by weight of prepolymer resin solution of Example 1, 6.0 parts by weight are prepolymer and 3.0 parts by weight are acetone. The resin forming ingredients or prepolymer react in the presence of water and with water to provide a polyurethane resin accompanied by the evolution of carbon dioxide gas, thereby to provide an open-celled hydrophilic polymer as the reaction product. In the slurry, the resin forming ingredients react throughout the slurry mass so as to incorporate the soil ingredients in an open-celled network of polyurethane resin, thereby to impart to the completed rooting media all of the desirable plant growing characteristics of a good soil, namely, porosity maintenance capacity, water holding capacity, ion exchange capacity and pH buffering capacity. Further details of the prepolymer are set forth in U.S. Pat. No. 3,805,532 (particularly Example 1), and the disclosure thereof is incorporated herein by reference as is the disclosure of U.S. Pat. No. 3,805,531.

Other resin-forming systems may be utilized so long as they result in a continuous phase of resin that is open-celled and hydrophilic in character. For example, the various resin foam systems set forth in U.S. Pat. No. 3,373,009 may be utilized, and the disclosure thereof is hereby incorporated herein, provided that the resin formulations are modified to incorporate them into a slurry as specified above with respect to Example 1 using the mixture procedure of Example 1.

The temperature at which the molding operation can be carried out may be varied from about 5° C. to about 25° C., with the curing time being inversely porportional to the temperature, i.e., the curing time being approximately 10 minutes at 5° C. and approximately ⅛ minute at 25° C.

In making the slurry of Example 1, the soil mixture is first dispersed in the water, the water being added to the soil mixture until the resultant slurry begins to break, the slurry having a consistency like that of cake batter, whereby it readily flows and fills all areas of an associated mold. Thereafter the polyurethane resin-forming solution is added.

In accordance with the present invention, it is essential that the amount of resin-forming solution utilized be such that the resultant rooting media, on a dry basis, comprises from about 15% by weight to about 30% by weight of polyurethane resin, and likewise comprises from about 70% by weight to about 85% by weight of soil particles. If the polyurethane resin content of the rooting media is less than about 15% by weight on a dry basis, the rooting media will crumble and fall apart, particularly immediately after the molding thereof, and during removal from its mold, since the polymer attains essentially to its full strength only after curing for at least 24 hours. However, in a production facility it is necessary for economic reasons to remove the rooting media from its mold immediately after forming thereof, whereby it is essential that the polyurethane resin content be at least about 15% by weight on a dry basis of the rooting media. On the other hand, the polyurethane resin content of the rooting media on a dry basis must be no greater than about 30% by weight. Higher concentrations provide a rubbery rooting media in which roots have difficulty growing and penetrating, and water and air are prevented from penetrating. A skin also tends to form on the surface of the rooting media through which seeds beneath the surface have difficulty in penetrating, and water and air have difficulty in gaining access.

In accordance with the present invention it is also essential that the ratio between the total water, i.e., the moisture in the soil mixture plus the added water, and the polyurethane resin-forming solution be in the range of from about 3.5:1 to about 10:1. If the ratio of water to resin-forming solution falls below 3.5:1, the resultant rooting media has a surface characteristic such that water penetration is poor, and the rooting media also has a very high shrink coefficient when dried. If the ratio between the water and the resin-forming solution is greater than 10:1, the water in the slurry tends to separate out and the resin and soil particles float to the top of the slurry, and the resultant rooting media has voids therein, i.e., is not of uniform consistency throughout the mass thereof. A preferred viscosity of the slurry at the time of molding is in the range from about 100 centipoises to about 200 centipoises.

The resultant rooting media is a resilient, integral body of spongy open-celled hydrophilic polyurethane polymer. The polymer forms a first essentially continuous phase extending throughout the body and has passages, most of capillary size, extending through the body and forming a second essentially continuous phase extending throughout the body. An important feature of the present invention resides in the fact that a quantity of particles of soil mixture are also distributed throughout the body of sponge-like polymer and are held thereby but with a substantial portion, and in fact in most cases a majority of the portion of the surface area of the particles of soil mixture, being exposed and in communication with the open passages. This highly desirable physical structure of the rooting media results from (1) the ingredient mixing method, i.e., first forming a mixture of the soil ingredients and the water, and thereafter adding the resin-forming solution to that mixture, (2) providing from about 15% to about 30% by weight of resin on the dry basis in the rooting media, and (3) providing a water to resin-forming ratio in the range of from about 3.5:1 to about 10:1 during the polymerizing of the rooting media from the slurry. The resultant exposed surface areas of the particles of soil mixture provide colloidal contact exchange surfaces in communication with the passages, and therefore are in position to be contacted by water and nutrients in the passages and by roots that grow into the passages and through the body. The exposed particles of soil mixture have collectively a porosity maintenance capacity, a water holding capacity, an ion exchange capacity and a pH buffering capacity, all necessary for the successful growth of plants in the rooting media.

The passages in the body of polymer facilitate the growth of roots through the body and against the exposed surfaces of the particles of soil mixture and against the contact exchange surfaces provided thereby so as to effect direct ion uptake between the roots and the particles of soil mixture. More specifically, the soil mixture provides colloidal contact exchange surfaces necessary for the proper feeding of nutrients to the growing roots. The passages also provide ready entry for water and air throughout the body of rooting media and against the exposed surfaces of the particles of soil mixture and against the roots growing in the passages.

It will be appreciated that a relatively low amount of urethane resin is utilized in forming the rooting media of the present invention. As a result, the rooting media is resilient and cohesive or integral, but is not rubbery in nature. Likewise there is no impenetrable skin formed on the surfaces of the body of the rooting media which would inhibit access of water and nutrients thereinto or inhibit growth of roots therethrough or prevent sprouts of seeds therein from extending outwardly through the associated surface. The passages in the rooting media of the present invention are in general substantially smaller than those in prior rooting media, and as a result there is a substantially larger capillary water content so that it is not necessary to water the rooting media of the present invention as often as prior rooting media, and this also provides for a higher field capacity of the rooting media of the present invention, i.e., the rooting media has a greater ability to hold water after a twenty-four hour period of draining and evaporation, and also resists air drying.

The ion exchange capacity of the rooting media of the present invention is substantially greater than that of the resin stabilized rooting media available heretofore, whereby a higher fertilizer holding capacity is exhibited by the rooting media of the present invention so that the rooting media need be fertilized less frequently and there is a substantially lesser loss of fertilizers through leaching.

Other soils in addition to those discussed above with respect to Example 1 are useful in the invention of the present application. In general, all mineral soils are useful herein and can be suitably bound using the open-celled hydrophilic polymer to bind the soil ingredients into a coherent mass.

The synthetic organic soil substitutes are also useful. A first type is that comprised of pine barks, wood shavings, sawdust, redwood chips, peanut hulls, pecan shells, straw, leaves or similar organic materials, provided they are reduced in particle size to dimensions useful as rooting media. All of these materials also are useful if composted, subjected to bacterial reduction, and the like, i.e., composted barks, leaf molds, etc. Also useful are sewage wastes and composted sewage wastes as well as animal manures and composted aminal manures. Likewise useful are ground garbage and composted ground garbage, as well as fungal and bacterial residues.

The following are additional specific examples of soil mixtures and slurries useful in carrying out the present invention.

EXAMPLE 2

The method of Example 1 was utilized but the past soil and Vermiculite in the soil mixture were omitted and in their place was used 97 lbs. of ground spaghum. The resultant rooting media had all of the desirable characteristics of the rooting media formed utilizing the method of Example 1.

EXAMPLE 3

The procedure of Example 1 was utilized, but the soil peat and Vermiculite in the soil mixture were omitted and in their place there was used 97 lbs. of ground composted pine bark. The resultant rooting media had all of the advantages and characteristics described above with respect to the rooting media formed utilizing the method of Example 1.

EXAMPLE 4

The following soil mixture was provided:

| Soil | Quantity |
| --- | --- |
| Peat | 68 lbs. |
| Vermiculite | 17 lbs. |
| Sewage Sludge | 15 lbs. |
| | 100 lbs. |

The above ingredients were mixed and incorporated into a slurry as described above with respect to Example 1. The resultant rooting media had all of the desirable characteristics and properties described above with respect to the rooting media produced utilizing the method of Example 1. The sewage sludge provides the fertilizers required in the rooting media.

EXAMPLE 5

A soil mixture was provided having the following composition:

| | | |
| --- | --- | --- |
| Straw Composted With Sewage Sludge (for 6 months to one year) | 79. | lbs. |
| Vermiculite, Agricultural Grade | 20. | lbs. |
| Bone Meal | 0.5 | lbs. |
| Dolomitic Lime | 0.5 | lbs. |
| | 100. | lbs. |

This mixture was utilized in the same slurry as in Example 1. The resultant rooting media had all of the advantages and properties discussed above with respect to the rooting media produced using the method of Example 1.

EXAMPLE 6

The following soil mixture was provided:

| | |
| --- | --- |
| Peat Soil | 33 lbs. |
| Fine Sand | 33 lbs. |
| Silt Loam Soil | 33 lbs. |
| Fertilizer (5-10-5) | 1 lb. |
| | 100 lbs. |

The soil mixture was utilized in the slurry having a composition of Example 1. The resultant rooting media had all of the desirable properties and characteristics described above with respect to the rooting media formed using the method of Example 1.

EXAMPLE 7

The soil mixture of Example 1 was utilized in a slurry formulated and mixed as in Example 1 and having the following composition:

| | |
| --- | --- |
| Soil Mixture (47% Moisture) | 48.4 lbs. |
| Polyurethane Resin-Forming Solution | 12.8 lbs. |
| Water | 38.8 lbs. |
| | 100.0 lbs. |

The resultant rooting media from Example 7 had all of the desirable characteristics and properties of the rooting media made using the method of Example 1. The resultant rooting media from Example 7 had a lower soil mixture content and a higher resin content on a dry weight basis than the rooting media from Example 1, i.e., the rooting media of Example 1 had a soil mixture content of about 81.8% on a dry weight basis and a resin content of about 18.2%, whereas the rooting media from Example 7 had a soil mixture content of about 75.3% on a dry weight basis and a resin content of about 24.7%. The total water to resin-forming solution ratio in Example 7 is 4.8:1.

EXAMPLE 8

The soil mixture of Example 1 was formulated and mixed as in Example 1 with the ingredients indicated to provide the following slurry:

| | |
| --- | --- |
| Soil Mixture (47% Moisture) | 51.6 lbs. |
| Polyurethane Resin-Forming Solution | 7.0 lbs. |
| Water | 41.4 lbs. |
| | 100.0 lbs. |

The rooting media formed from this slurry had all of the desirable properties and characteristics of the rooting media made using the slurry of Example 1. The soil mixture content of the rooting media of Example 8 is about 85% on a dry weight basis and the resin content of the rooting media of Example 8 is about 15%. The total water to resin-forming solution ratio in Example 8 is 9.4:1.

EXAMPLE 9

The following ingredients were mixed to form a slurry:

| | |
|---|---|
| Soil Mixture (47% Moisture) | 46.7 lbs. |
| Polyurethane Resin-Forming Solution | 15.8 lbs. |
| Water | 37.5 lbs. |
| | 100.0 lbs. |

The slurry of Example 9 was formulated and mixed in accordance with the method of Example 1, and thereafter utilized to form a rooting media in accordance with the method of Example 1. The resultant rooting media had the desirable properties and characteristics set forth above with respect to the rooting media of Example 1. The soil mixture content of the rooting media of Example 9 is about 70.5% on a dry weight basis and the resin content of the rooting media of Example 9 is about 29.5% on a dry weight basis. The total water to resin-forming solution ratio in Example 9 is 3.8:1.

An important feature of the present invention is the improved release agent useful in molding the prepolymer, the release agent giving multiple moldings before the requirement for reapplication of the release agent to the mold. The active ingredient in the release agent is Food Grade Lecithin (granular in form), this material exhibiting a complete lack of phytotoxicity, whereby the presence of quantities thereof on the surface of rooting media in no way inhibits the growth of plants thereon and therein. In a preferred form of release agent in accordance with the present invention, 400 grams of lecithin are placed in 400 ml. of acetone. The volume is then brought up to 4,000 ml. by adding water, this serving to produce a dispersion of lecithin in the acetone-water solution. The resultant dispersion is permitted to digest at ambient conditions for a period of from about twenty-four hours to about seventy-two hours with occasional agitation to produce a colloidal dispersion of lecithin in an acetone-water solution, the dispersion being colloidal in character since it exhibits the Tyndall effect characteristic of such colloidal dispersions.

In using the resultant release agent, the surfaces of the molds that are to come into contact with the prepolymer are either dipped into the lecithin dispersion in the acetone-water solution or the same is sprayed thereon as illustrated in FIG. 12 of the drawings. Thereafter the mold surfaces are permitted to air dry at ambient conditions, this leaving a thick coating of lecithin on the molding surfaces. More specifically, the thickness of the lecithin layer may be from about 0.01 mm. to about 1.0 mm., a preferred thickness being 0.1 mm. Such thicknesses of release agent on the molding surfaces permits multiple use of the molds before it is necessary to retreat the molds with the release agent, as many as 20 pieces of rooting media being formed without retreatment, and a minimum of 5 being possible even at the lower end of the thickness range.

It will be appreciated that either smaller or larger quantities of lecithin may be placed in the acetone solution, but one part by weight of lecithin is placed in at least an equal party by weight of acetone. Likewise the volume may be brought from the 400 ml. of acetone to some volume greater or smaller than 4,000 ml. without departing from the present invention, from about 6 to about 12 parts by weight of water being added for each part by weight of acetone.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A method of making a body of rooting media comprising the steps of providing a mold open at the upper end and having a closure at the lower end thereof, applying a non-phytotoxic release layer to the inner surfaces of said mold, forming a mixture of soil-like materials in water, adding foam-forming precursors of a thermosetting resin to said mixture to form a slurry which upon curing provides a resilient open-celled hydrophilic polymer, pouring said slurry into said mold and permitting said resin to cure until the body of rooting media is cohesive, and thereafter removing the resultant body of rooting media from said mold.

2. The method of making a body of rooting media set forth in claim 1, wherein said foam-forming precursors of a thermosetting resin is a prepolymer for said thermosetting resin.

3. The method of making a body of rooting media set forth in claim 1, wherein said thermosetting resin is a polyurethane resin.

4. A method of making a body of rooting media comprising the steps of providing a mold, applying a colloidal dispersion of non-phytotoxic lecithin in water to the surfaces of said mold, evaporating the water therefrom to form a dry non-phytotoxic lecithin release layer thereon, introducing into said mold a slurry of soil-like material in water and a foam-forming thermosetting resin which upon curing provides an open-celled hydrophilic polymer, permitting the resin to cure until cohesive, and then removing the resultant body of rooting media from said mold.

5. The method of making a body of rooting media as set forth in claim 4, and further comprising the steps of heating the resultant body of rooting media in water at a temperature of about up to 180° F. to loosen the structure thereof and to pasteurize the same and to improve the water passage characteristics thereof and the handling characteristics thereof.

6. A method of making a body of rooting media comprising the steps of providing a mold open at the upper end and having a closure at the lower end thereof, applying a colloidal dispersion of non-phytotoxic lecithin in an acetone-water solution to the inner surfaces of said mold, evaporating the acetone and water therefrom to form a dry non-phytotoxic lecithin release layer of lecithin thereon, forming a mixture of soil-like materials in water, adding foam-forming precursors of a thermosetting resin to said mixture to form a slurry which upon curing provides a resilient open-celled hydrophilic polymer, pouring said slurry into said mold and permitting said resin to cure therein until the body of rooting media is cohesive, and thereafter removing the resultant body of rooting media from said mold.

7. The method of making a body of rooting media as set forth in claim 6, wherein the ratio by weight in said slurry between the total water therein and the synthetic organic plastic resin is from about 3.5:1 to about 10:1.

8. The method of making a body of rooting media as set forth in claim 6, wherein said slurry is initially at a temperature from about 5° C. to about 25° C.

9. The method of making the body of rooting media as set forth in claim 6, wherein said colloidal dispersion of lecithin in acetone-water solution is made by placing one part by weight of lecithin in at least an equal part by weight of acetone and adding a quantity of water equal to of from about 6 to about 12 times the weight of acetone, permitting said dispersion to digest at ambient conditions for about twenty-four to seventy-two hours with occasional agitation, and after application of said dispersion to the mold surfaces, drying said surfaces to leave a coating of lecithin thereon having a thickness in the range from about 0.01 mm. to about 1 mm.

10. A method of making a body of rooting media comprising the steps of providing a mold open at the upper end and having a closure at the lower end thereof, applying a colloidal dispersion of non-phytotoxic lecithin in an acetone-water solution to the inner surfaces of said mold, evaporating the acetone and water therefrom to form a dry non-phytotoxic lecithin release layer of lecithin thereon, forming a mixture of soil-like mixture materials in water, adding a foam-forming thermosetting resin to said mixture to form a slurry which upon curing provides a resilient open-celled hydrophilic polymer, pouring said slurry into said mold and thereafter covering the upper open end of said mold and inverting said mold when foaming of the resin begins so as to maintain the suspension of the particles of soil-like material throughout the slurry during the curing of the polymer, permitting the resin to cure in said mold until the body of rooting media is cohesive, and thereafter removing the resultant body of rooting media from said mold.

* * * * *